United States Patent [19]

Kanazawa et al.

[11] Patent Number: 5,217,697
[45] Date of Patent: Jun. 8, 1993

[54] HOUSING FOR GAS GENERATING COMPOSITION

[75] Inventors: Teruo Kanazawa; Satoru Suzuki; Tsukasa Motohira; Toshinori Ima, all of Aichi, Japan

[73] Assignee: Nippon Oil and Fats Co., Ltd., Tokyo, Japan

[21] Appl. No.: 755,518

[22] Filed: Aug. 29, 1991

[30] Foreign Application Priority Data

Aug. 31, 1990 [JP] Japan .................. 2-232040
Aug. 1, 1991 [JP] Japan .................. 3-193307

[51] Int. Cl.$^5$ .............................. B60R 21/16
[52] U.S. Cl. ................... 422/165; 55/385.3; 102/531; 280/731; 280/735; 280/743; 422/167; 422/305
[58] Field of Search ............... 422/164–167, 422/305; 55/385.3; 280/734, 735, 731, 743; 102/531

[56] References Cited

U.S. PATENT DOCUMENTS 3,986,456 10/1976 Doin et al. ................. 422/166
4,278,638 7/1981 Nilsson et al. ............... 422/166
4,547,342 10/1985 Adams et al. ............... 422/166

FOREIGN PATENT DOCUMENTS 62-5094 2/1987 Japan .

Primary Examiner—Robert J. Warden
Assistant Examiner—Amalia Santiago
Attorney, Agent, or Firm—Stetina and Brunda

[57] ABSTRACT

A housing for a gas generating composition comprises an igniter chamber for retaining an igniter material. A combustion chamber is formed around the igniter chamber, and a gas generating composition is disposed in the combustion chamber. A cooling chamber with a gas exhaust port is formed around the combustion chamber. A coolant for cooling gas is accommodated in the cooling chamber. The igniter chamber, the combustion chamber and the cooling chamber communicate with one another through ports. A first shell constitutes the top wall of the combustion chamber, an intermediate wall between the combustion chamber and the cooling chamber, and at least the bottom wall of the cooling chamber. The first shell is integrally formed of a metal plate with an even thickness, and opens downward at its center portion and is open at least upward at its outer surface. An igniter housing constitutes at least the peripheral wall of the igniter chamber. The igniter housing is joined to the inner surface of the top wall of the first shell, and is open downward. A second shell is open downward, and is joined to the first shell at the periphery of the opening. The second shell and the first shell cooperate to define the cooling chamber. A cover is joined to the first shell and the igniter housing to constitute the bottom walls of the igniter chamber and the combustion chamber.

9 Claims, 3 Drawing Sheets

HOUSING FOR GAS GENERATING COMPOSITION

This application claims the priorities of Japanese Patent Application Nos. 2-232040 filed on Aug. 31, 1990 and 3-193307 filed on Aug. 1, 1991.

BACKGROUND OF THE INVENTION

1. Field of the Invention

The present invention relates to a housing for retaining a gas generating composition for inflating an air bag and a method for manufacturing the same.

2. Description of the Related Art

An air bag system is installed in a sterring wheel of an automobile to prevent the driver from suffering possible injuries in an automobile accident. This air bag system generally comprises an air bag, a gas generating composition for inflating the air bag and a housing for retaining the gas generating composition. Since steering wheels equipped with an air bag system are heavier than steering wheels without air bag system, the steering manipulation for the former type is likely to be unstable. In this respect, it is desirable that individual parts constituting the air bag system, particularly, the housing for the gas generating composition be light in weight. To improve the specific fuel consumption to save the energy, it is desirable to make the bodies of vehicles as light as possible. In this respect, it is also desired that the components of the air bag system are made lighter.

Further, for the purpose of reducing injuries of drivers in accidents as much as possible, there is a demand of installing an air bag system in many vehicles. Fulfilling the demand requires that the mass productivity of individual components of each air bag system be increased so that the air bag system may be provided at cheapest possible prices.

With the above points in mind, a conventional housing for a gas generating composition as disclosed in, for example, U.S. Pat. No. 4,547,342, has a structure shown in FIG. 7.

Referring to FIG. 7, a ridge 32 has a top-open cylindrical shape with a bottom, and has a flange 32a. A housing 31 has a bottom-open cylindrical shape with a top. The housing 31, is fitted in the ridge 32, and is connected thereto by friction welding. The ridge 32 and housing 31 are made of aluminum. This housing is attached through the flange 32a to a base plate (not shown) of a steering wheel. An igniter chamber 33 is provided at the center of the housing in the space defined by the ridge 32 and the housing 31. A squib 34 is provided upright at the lower center portion in the igniter chamber 33. The igniter chamber 33 is filled around the squib 34 with an igniter material 36 for igniting a gas generating composition when heated by the squib 34.

Around the igniter chamber 33 is provided a combustion chamber 38, with an intermediate wall 37 in between. This combustion chamber 38 communicates with the igniter chamber 33 via a plurality of ports 39 formed through the intermediate wall 37. The combustion chamber 38 is filled with pelletized gas generating composition 35. Around the combustion chamber 38 is provided a cooling chamber 41, with an intermediate wall 40 in between. The cooling chamber 41 communicates with the combustion chamber 38 via ports 43 formed through the intermediate wall 40. In the cooling chamber 41 and along the peripheral portion inside the combustion chamber 38 is installed filtering material 44, which cools gas generated by combustion and decomposition of the gas generating composition 35 and at the same time filters other solid by-products than the generated gas.

In the case of the above housing for a gas generating composition, however, the ridge 32 and the housing 31, respectively, are integrally formed of aluminum that has substantially a poor material strength. To strengthen these two components; therefore, a thick walled material must be used, which impedes the air bag system from becoming lighter. In addition, those members 32 and 31 are formed by cold forging to ensure the desired strength, which stands in the way of improving the mass productivity and thus has an economical disadvantage.

There is another gas generating device with a structure different from the above type, as disclosed in Examined Japanese Patent Publication No. 62-5094. This gas generating device for a gas generating composition will be described referring to FIG. 8.

An igniter 51 is disposed in the center portion of the gas generating device. A squib 52 is disposed at the inner bottom portion of the igniter 51, with an igniter material 53 filling around the upper portion of the squib 52. Secured to the outer surface of the igniter 51 is the inner periphery of a ring-shaped casing 54, welded by electron beam irradiation. The casing 54 is formed by cold working.

The casing 54 constitutes a bottom wall 58 of a combustion chamber 57, and a top wall 59 and a peripheral wall 60 of a cooling and filtering chamber 55. A cover 61 for the combustion chamber 57 is securely welded between the igniter 51 and the peripheral wall 60 of the casing 54, which has an inverted-U shape in cross section. The combustion chamber 57 is filled with a gas generating composition 63. The combustion chamber 57 communicates with the interior of the igniter 51 via ports 64 bored through the peripheral wall 62.

A ring-shaped support plate 65 is fixed to the lower portion of the peripheral wall 60 of the casing 54. The support plate 65 and the peripheral wall 60 of the casing 54 define the cooling and filtering chamber 55, which is filled with a filtering material 66. This chamber 55 communicates with the combustion chamber 57 via a port 67 bored through the peripheral wall 60 of the casing 54. A gas exhaust port 56 is formed through the peripheral wall 60.

In the above-described housing for a gas generating composition, the casing 54 having a cross section extending zigzag in the longitudinal direction constitutes the bottom wall 58 of the combustion chamber 57, and the top wall 59 and peripheral wall 60 of the cooling and filtering chamber 55. This housing therefore has a higher mechanical strength than the one disclosed in the aforementioned U.S. Pat. No. 4,547,342, so that its casing 54 can be made with thinner walls. Actually, the casing 54 is designed with a wall thickness of about 2.5 mm. Further, since the casing 54 is fixed to the igniter 51 by electron beam welding, it can be formed lighter with reduced welded area. The combustion chamber 57 is however formed by welding the casing 54 to the cover 61. The cover 61 is provided on the side where an air bag 65 will extend, i.e., on the driver side. If pressure in the combustion chamber 57 rises above the design limit of pressure resistance of the gas generating composition housing due to some reason, such as clogging of the filtering material or the housing being enveloped in flames, the cover 61 for the housing can be broken. This in turn may injured the driver.

Furthermore, the casing 54 has portions uneven in thickness. This makes it impossible to provide the housing simply by pressing a plate with a uniform thickness, and requires machining, such as grinding. This housing for a gas generating composition therefore is not suitable for mass production.

SUMMARY OF THE INVENTION

It is therefore an object of the present invention to provide a housing for a gas generating composition, which can be made lighter while ensuring the safety of the occupants of a vehicle. Another object is to provide a housing suitable for mass production that can be manufactured at a lower cost, and to provide a method for manufacturing the same.

To achieve the above objects, a housing for a gas generating composition according to the present invention includes an igniter chamber for retaining an igniter material. A combustion chamber is formed around the igniter chamber, and a gas generating composition for generating gas when ignited by the igniter material is disposed in the combustion chamber. A cooling chamber with a gas exhaust port is formed around the combustion chamber. A coolant for cooling gas is accommodated in the cooling chamber. The igniter chamber, the combustion chamber and the cooling chamber communicate with one another through ports. A first shell constitutes the top wall of the combustion chamber, an intermediate wall between the combustion chamber and the cooling chamber, and at least the bottom wall of the cooling chamber. The first shell is integrally formed of a metal plate with an even thickness, and is open downward at its center portion and open at least upward at its outer surface to define a peripheral opening. An igniter housing constitutes at least the peripheral wall of the igniter chamber. The igniter housing is joined to the inner surface of the top wall of the first shell, and is open downward. A second shell is open downward, and is joined to the first shell at the periphery of the peripheral opening. The second shell and the first shell cooperate to define the cooling chamber. A cover is joined to the first shell and the igniter housing to constitute the bottom walls of the igniter chamber and the combustion chamber.

It is preferable that the cover comprise a first cover arrangement and a second cover. The first cover is located in the center portion of the center opening of the first shell so as to close the lower opening of the igniter housing. The second cover covers the peripheral portion of the central downward opening of the first shell.

In a method aspect of the invention for producing the above housing, the first and second shells are formed integrally of a metal plate with an even thickness by press molding. Then, the igniter housing is secured to the inner surface of the top wall of the first shell. Subsequently, a cooling means is disposed in the first shell. After one of the shells is fitted to the other shell, the fitted portion will be welded using either a laser beam or an electron beam. Then, a gas generating composition is disposed in the combustion chamber, and an igniting means in the igniter chamber. Finally, a cover constituting the bottom walls of the igniter chamber and the combustion chamber is securely joined to the first shell and the igniter housing.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention as applied to a housing for a gas generating composition for use in an air bag which is to be installed in the steering wheel in a vehicle, will now be described referring to FIGS. 1 through 4.

Figure 1:
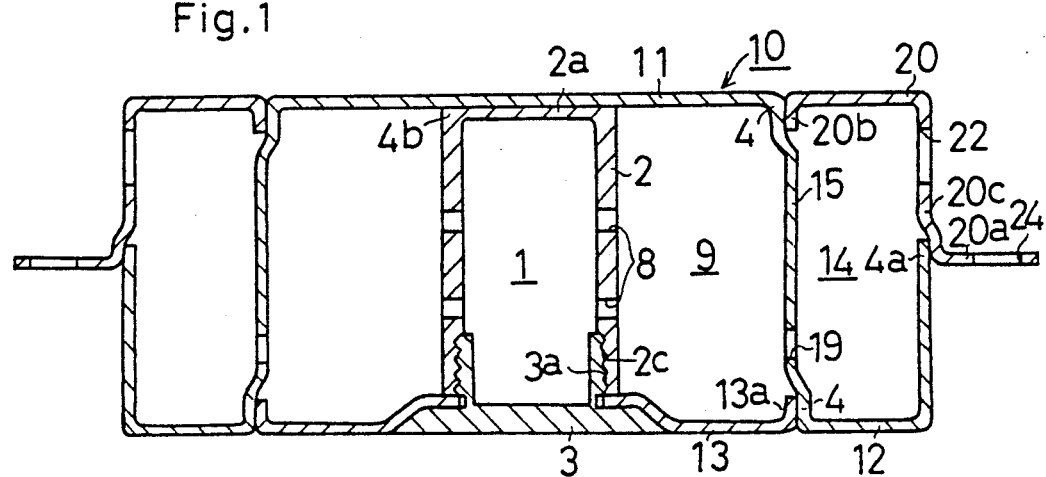
FIG. 1 is a cross section of a housing for a gas generating composition according to a first embodiment of the present invention.

As shown in FIG. 1, the housing for a gas generating composition includes an igniter chamber 1 positioned in the center, an annular combustion chamber 9 disposed around the igniter chamber 1, and an annular cooling chamber 14 surrounding the combustion chamber 9. The igniter chamber 1, the combustion chamber 9 and the cooling chamber 14 respectively contain an igniter material 7, a gas generating composition 16 and a filtering material 21.

For the purposes of this description, the upper most end of the devices illustrated in FIGS. 1 and 3–8 shall be referred to as the top and the lower most end thereof shall be referred to as the bottom. Additionally, the word upward shall refer to being in the direction of the top and the word downward shall refer to being in the direction of the bottom. Thus, a downward opening is an opening facing the bottom or lower most portion of the device and an upward opening is similarly an opening on the top or upper most portion of the device or a component thereof.

The igniter chamber 1 includes a tubular igniter housing 2 with a top wall, and an igniter cap 3 covering the bottom opening of the igniter housing 2. The igniter cap 3 has a tubular protrusion in the center, with a male screw 3a formed on the outer surface of the protrusion. A female screw 2c is formed in the inner wall of the bottom opening of the igniter housing 2. As the male screw 3a of the igniter cap 3 is screwed into the female screw 2c of the igniter housing 2, the igniter cap 3 is attached to the igniter housing 2.

A first shell 10 constitutes a top wall 11 of each of the igniter chamber 1 and the combustion chamber 9, as well as an intermediate wall 15 between the combustion chamber 9 and the cooling chamber 14 and part of the outer wall of the cooling chamber 14. That portion of the first shell 10 partially surrounding the cooling chamber 14 defines a peripheral opening which opens upwardly. A top portion 2a of the igniter housing 2 is fixed to the inner center portion of the top wall of the combustion chamber 9 at their junction 4b.

The first shell 10 has an annular recess 4 formed in the inner periphery of its lower opening outside the igniter cap 3. A ring-shaped cover plate 13 is provided between the recess 4 and the igniter cap 3. The cover plate 13 has a rim 13a formed on its outer periphery. The rim 13a is fitted in the recess 4 and the two parts are welded together. The cover plate 13 has its inner periphery held between the igniter housing 2 and the igniter cap 3 around the male screw 3a of the igniter cap 3.

A ring-shaped second shell 20 is attached to the outer top portion of the first shell 10 to serve as a top wall 20 of the cooling chamber 14 and part of the outer wall thereof. The second shell 20 has an annular recess 4 formed in the upper outer periphery of the intermediate wall 15, and a rim 20b formed on its inner periphery. The second shell 20 also has a flange 20a integrally formed on its outer periphery, and an annular recess 20c formed therein. The rim 20b of the second shell 20 is fitted in the annular recess 4 of the first shell 10, while the outer periphery 4a of the first shell 10 is fitted in the annular recess 20c. Both shells 10 and 20 are securely fixed together at these junctions. In the peripheral wall of the ingniter housing 2 are formed a plurality of ports 8 through which the igniter chamber 1 communicates with the combustion chamber 9. In the aforementioned intermediate wall 15 a plurality of ports 19 are formed through which the combustion chamber 9 communicates with the cooling chamber 14. These ports 8 and 19 may be sealed with aluminum foil to prevent the humidity from penetrating the chambers 1 and 9.

Figure 2:
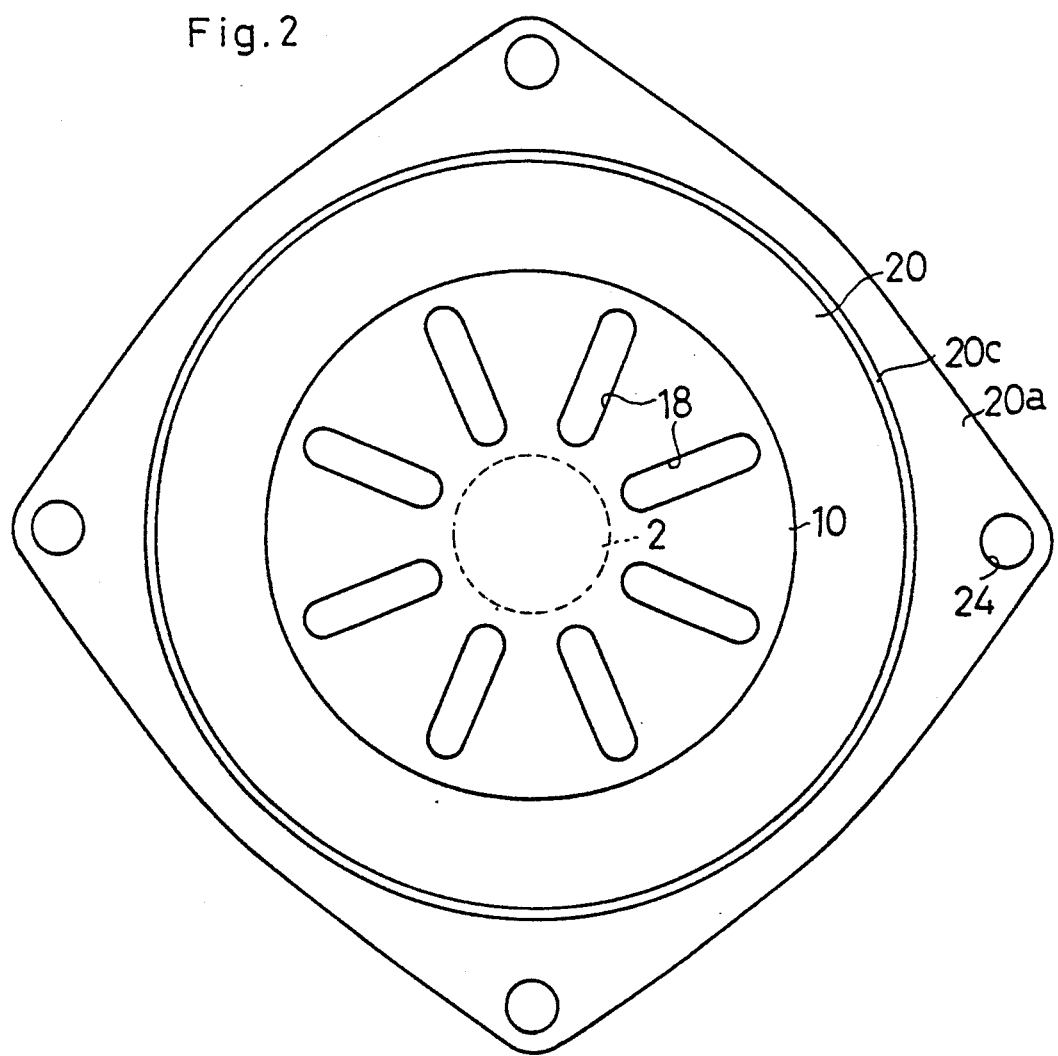
FIG. 2 is a plan view illustrating the housing according to the first embodiment.

The top wall 11 of the combustion chamber 9 has a plurality of reinforcing recesses 18 formed radially so as to provide sufficient resistance against the pressure rise in the combustion chamber 9 at the time of combustion of a gas generating composition, as shown in FIG. 2.

Figure 3:
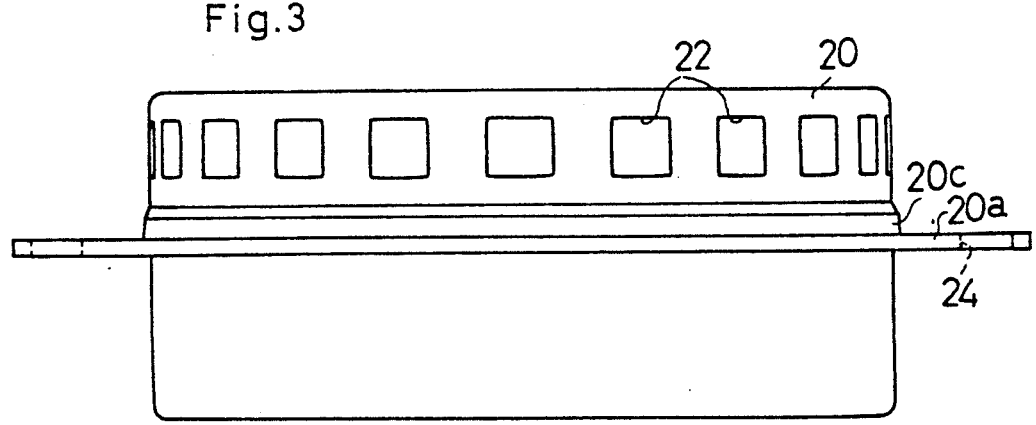
FIG. 3 is a front view showing the housing according to the first embodiment.

A plurality of exhaust ports 22 are formed in the upper outer wall of the second shell 20 as shown in FIG. 3. Bolt holes 24 are bored in the flange 20a of the second shell 20 through which the housing is fixed to the steering wheel in a vehicle by means of bolts (not shown). The housing is designed about 30 to 40 mm high, and about 90 to 110 mm in diameter, excluding the flange 20a.

Figure 4:
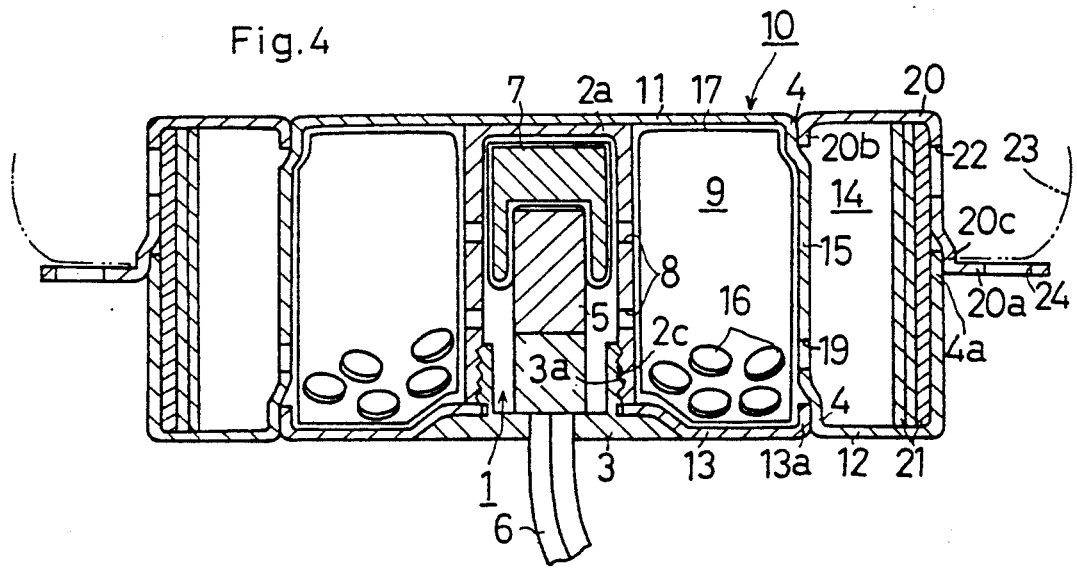
FIG. 4 is a cross section illustrating a gas generating composition retained in the housing for a gas generating composition according to the first embodiment.

As shown in FIG. 4, a squib 5 is fixed upright onto the igniter cap 3 at the inner bottom portion of the igniter chamber 1. A lead 6 is connected to the squib 5, while an igniter material 7 is loaded around the upper portion of the squib 5. The squib 5 and the igniter material 7 constitute an igniting means. The gas generating composition 16 in the combustion chamber 9 is packed in an aluminum casing 17.

As the gas generating composition 16, a well-known composition can be used, such as a combination of an azide of an alkali metal or an alkaline earth metal and a metal oxide; typically sodium azide. The gas generating composition may be pellet or disk shaped. The gas generating composition 16 shown in FIG. 4 is pellet-shaped. A filter made of metal fibers or inorganic fibers is used as a filtering material 21 in the cooling chamber 14, for example.

A folded air bag 23 is attached to the above-structured housing for a gas generating composition as indicated by the two-dot chain line in FIG. 4. Both the bag 23 and the housing are installed in the steering in a vehicle. If a sensor (not shown) installed in a vehicle detects a car crash, for example, the squib 5 is rendered conductive via the lead 6, to generate heat. Accordingly, the igniter material 7 will be ignited. A flame and heat caused by the ignition of the igniter material 7 propagates through the ports 8 of the igniter housing 2 into the combustion chamber 9 to burn the gas generating composition 16 in the combustion chamber 9, thereby generating nitrogen gas and other solid by-products from the gas generating composition 16. These products enter the cooling chamber 14 through the ports 19 in the intermediate wall 15. In the cooling chamber 14, the solid by-products are filtered by the filtering material 21, while the nitrogen gas is cooled off. Then, only the nitrogen gas is injected into the air bag 23 from an exhaust port 22 at the upper portion of the cooling chamber 14 to expand the air bag 23.

Before discussing a method for manufacturing the above-described housing for a gas generating composition, the molding material for the housing will be explained.

The first and second shells 10 and 20, and the cover plate 13 are formed of metallic material for press molding, such as stainless steel, titanium, titanium alloy or magnesium alloy.

The metallic material has a proporty of being hardened by pressing, thereby increasing its strength. According to the present invention, therefore, the shells 10 and 20, and the cover plate 13 can be formed thinner than those of the prior art while maintaining their predetermined strengths so as to make the overall housing lighter. The thickness of the material may usually be about 0.8 to 1 mm, and preferably about 1 mm.

Stainless steel (Japanese Industrial Standards SUS304L), 1 mm thick, is used in this embodiment. The shells and the cover plate can therefore be designed significantly thinner than those formed of a conventional material which is 1.5 to 4 mm thick. If even better corrosion resistance is required in addition to the mentioned properties of being light and having a sufficient strength, then titanium or a titanium alloy are preferable, and the thickness of the selected material can be set to about 1 to 3 mm.

The first shell 10, the second shell 20 and the cover plate 13 are formed by pressing a stainless steel plate. The stainless steel plate to be used has an even thickness, thus facilitating the pressing. Then, the filtering material 21 is inserted into the cooling chamber 14 in the first shell 10. The rim 20b of the second shell 20 is fitted into the annular recess 4 at the upper outer periphery of the first shell 10, and the junction 20c of the second shell 20 is fitted over the outer periphery 4a of the shell 10. These fitted portions are then secured by spot welding, laser welding or electron beam welding, providing a pressure resistant structure.

At the same time, the igniter housing 2 is secured at the junction 4b to the center portion of the underside of the first shell 10 by spot, laser or electron beam welding.

The casing 17 enclosing the gas generating composition 16 is loaded in the combustion chamber 9 of the first shell 10. After the cover plate 13 will be fitted into the annular recess 4 of the first shell 10, the recess 4 and the rim 13a of the cover plate 13 are welded together, providing a pressure resistant structure.

Finally, the squib 5 and the igniter material 7 are installed in the igniter housing 2, and the igniter cap 3 is screwed into the lower portion of the igniter housing 2, thus completing the assembly of a gas generating housing.

In order to prevent the agents from leaking into the housing, the housing may not be disassembled easily. It is therefore optimal to weld the individual shells 10 and 20 and the cover plate 13 together in the above-described manner. If the welding is carried out with the gas generating composition 16 sealed in the combustion chamber 9, however, the gas generating composition 16 (which will ignite at about 400° C.) may be ignited and burned by the welding-originated heat.

To inhibit the ignition of the gas generating composition 16, the components of the housing, particularly, the first shell 10 and the second shell 20, should have narrow areas where heat-melting is to be performed, and further have to be welded with laser or electron beams which involve a high welding speed. Table 1 below shows the comparison of various welding conditions. "TIG" in Table 1 indicates welding by tungsten inert gas arc.

TABLE 1

| Type of Welding | Welding Speed (m/min) | Bead Width (mm) | Temperature in Combustion Chamber (°C.) |
|---|---|---|---|
| TIG | 0.5 | 5 | 800 to 1000 |
| Laser | 4 | 2 | 200 to 250 |
| Electron Beams | 3 | 2 | 200 to 250 |

It is obvious from Table 1 that the welding by laser or electron beams ensures a lower temperature in the combustion chamber 9 and a smaller bead width.

As a welding rod is not normally used in the laser or electron beam welding, portions to be joined must be tightly attached. If welding is conducted while the components of the housing are not attached to one another with gaps therebetween, that portion which is melted by the heat of the laser or electron beam flows out, resulting in insufficient welding. Conventionally, it has been difficult that a pressed product has dimensional accuracy high enough to provide sufficient adhesion. Particularly, such has been impossible if a metal plate about 1 mm thick is used. This is because a thin metal plate when pressed will have the restoring force called "spring back," making it difficult to provide the accurate roundness and squareness. Particularly, this becomes more difficult when a thin metal plate less than 1 mm thick is used.

According to this embodiment, however, even though the first shell 10 is formed of a thin metal plate, the second shell 20 and the cover plate 13 are forced into the annular recess 4 to achieve their adhesion without involving any machining, such as turning. As a result, the melted portion can be prevented from flowing out, thus ensuring adequate welding. In addition, both shells 10 and 20 and the cover plate 13 can be joined easily and securely.

Further, the position where the first shell 10 and the cover plate 13, which define the combustion chamber 9, are welded is located opposite a driver. Therefore, when mounted in a vehicle, even if the cover plate 13 is broken due to an unexpected pressure rise the driver will not be injured. Furthermore, since the overall housing is formed of a thin metal plate, it can be made significantly lighter. Additionally, because of its lightness, the installed housing will not interfere with the steering manipulation, thus relieving the driver of his or her burden.

SECOND EMBODIMENT

Figure 5:
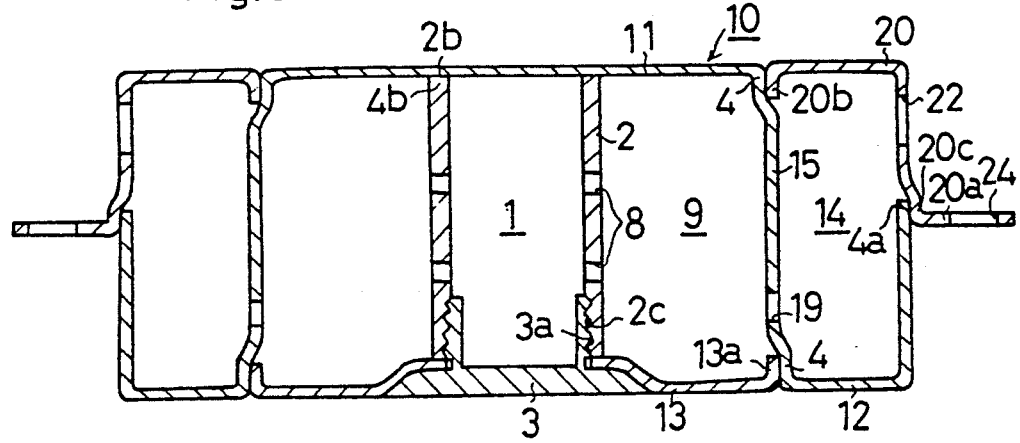
FIG. 5 is a cross section of a housing for a gas generating composition according to a second embodiment.

A second embodiment of the present invention will now be described referring to FIG. 5. The embodiment as illustrated in FIG. 5 differs from the first embodiment in that the igniter housing 2 dose not have a top portion 2a. A top end portion 2b of the igniter housing 2 is joined to the inner wall of the first shell 10 by spot, laser or electron beam welding.

Since the second embodiment produces the same effect as the first embodiment and needs no forming of the top portion 2a, machining will be easier.

Figure 6:
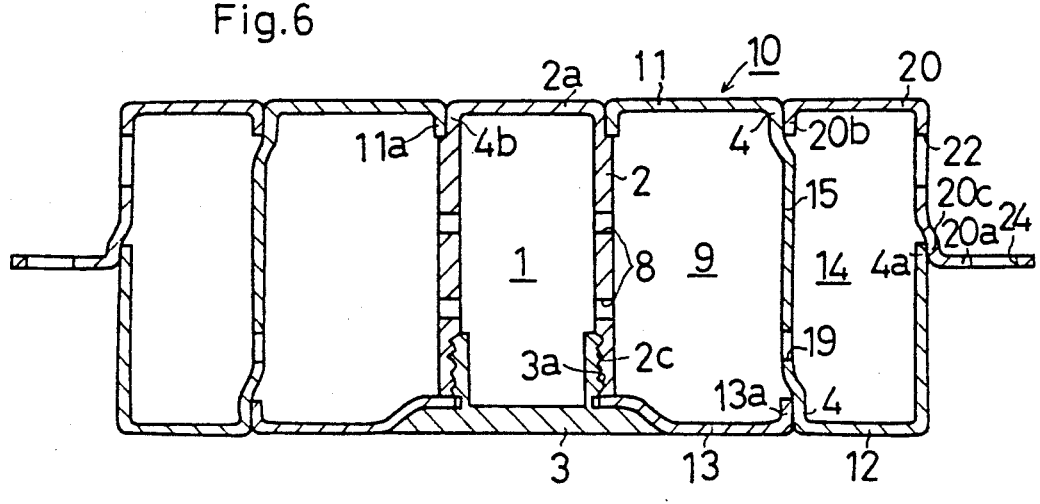
FIG. 6 is a cross section of a housing for a gas generating composition according to a third embodiment.
Figure 7:
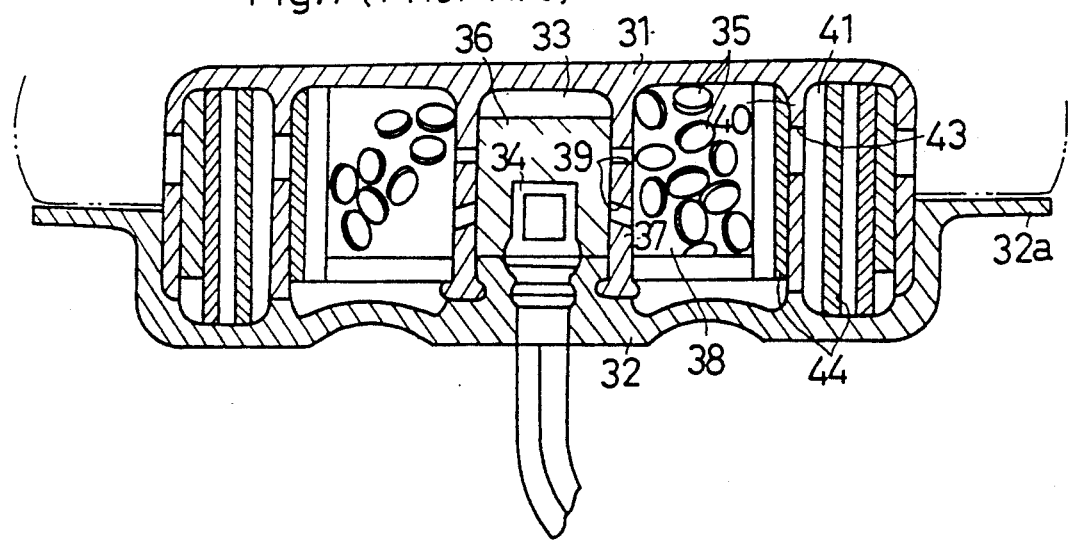
FIGS. 7 and 8 are cross-sectional views illustrating conventional housings for a gas generating composition.
Figure 8:
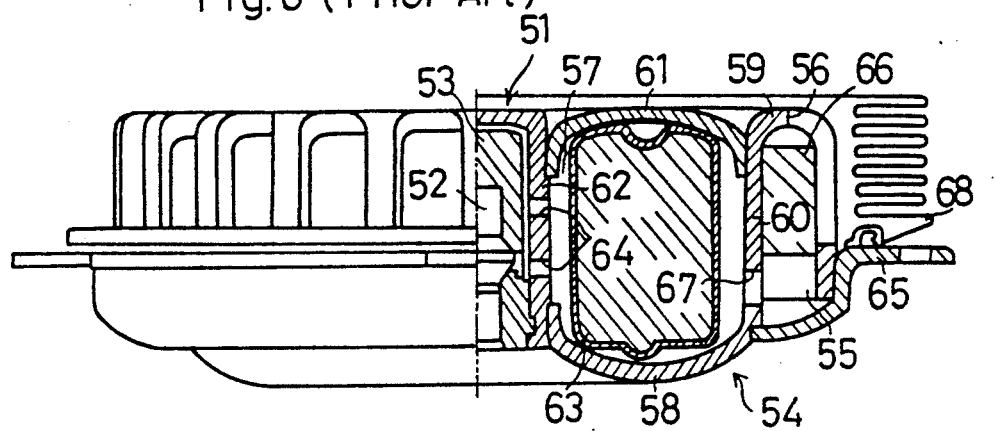

THIRD EMBODIMENT

Where a third embodiment of the present invention differs from the first embodiment will be explained referring to FIG. 6. In this embodiment shown in FIG. 6, an opening is formed in the center of the top wall 11 of the first shell 10. The rim 11a is formed on the periphery of that opening. The igniter housing 2 is forcibly fitted into the rim 11a. The peripheral portion of the top portion 2a of the igniter housing 2 and the rim 11a are securely welded together at the junction 4b by laser or electron beams.

According to this embodiment, therefore, since the igniter housing 2 can easily be positioned when it is securely welded to the first shell 10, working efficiency in assembling the housing for a gas generating composition is improved. The welding of the igniter housing 2 and the shell 10 is easy and secure because it will be performed after both are fitted together. The housing for a gas generating composition according to this embodiment can of course provide the same effect as the first embodiment.

The present invention is not limited to the above described vehicle applications. For example, the housing for a gas generating composition including an air bag may be located in a pipe where liquid, such as fuel, is transferred, so that the air bag can be inflated in an emergency to stop the liquid supply.

What is claimed is:

1. In a housing for a gas generating composition comprising an igniter chamber for retaining an igniting means, a combustion chamber located around the igniter chamber for retaining a gas generating composition for generating gas when ignited by the igniting means, a cooling chamber located around the combustion chamber and having a gas exhaust port, and a cooling means for cooling gas accommodated in the cooling chamber, the igniter chamber, the combustion chamber and the cooling chamber communicating with one another through ports, wherein the improvement comprises:

a first shell having a top wall, said first shell constituting a top wall of the combustion chamber, an intermediate wall between the combustion chamber and the cooling chamber, and at least a bottom wall of the cooling chamber, said shell being integrally formed of a metal plate with an even thickness, and having a central downward opening at a center portion thereof and having a peripheral opening which opens at least upwardly at an outer surface thereof;

an igniter housing constituting a lower opening and at least a peripheral wall of the igniter chamber, securely joined to the top wall of the first shell, and open downward;

a second shell having a downward opening, and securely joined to the first shell at a periphery of the peripheral opening at the outer surface of the first shell, said second shell together with the first shell defining the cooling chamber; and a cover arrangement securely joined to the first shell and the igniter housing and constituting bottom walls of the igniter chamber and the combustion chamber.

2. The housing according to claim 1, wherein the cover arrangement comprises:

a first cover located in a center portion of the central downward opening of the first shell so as to close the lower opening of the igniter housing; and a second cover for covering a peripheral portion of the central downward opening of the first shell.

3. The housing according to claim 2, wherein the first cover has a tubular protrusion closely fitted in the lower opening of the igniter housing.

4. The housing according to claim 2, wherein part of the second cover is held between a periphery of the lower opening of the igniter housing and the first cover.

5. The housing according to claim 2 wherein said second cover has a periphery including a coupling protrusion received within the central downward opening of the first shell, and wherein said central downward opening of the first shell has a recess formed therein in which the coupling protrusion is to be closely fitted.

6. The housing according to claim 1, wherein the igniter housing has a top wall through which the igniter housing is joined to an inner surface of the top wall of the first shell.

7. The housing according to claim 1, wherein the first shell constitutes part of a peripheral wall of the cooling chamber, and the second shell forms the remaining portion of the peripheral wall of the cooling chamber, opposite portions of the first and second shells joined in a close contact to each other at the peripheral wall of the cooling chamber.

8. The housing according to claim 1, wherein a protrusion protruding into the cooling chamber is formed in the second shell, and a recess in which the protrusion is to be closely fitted is formed in the first shell.

9. The housing according to claim 1 wherein said first shell comprises an opening formed in the center of the top wall of the combustion chamber constituted thereby, the igniter being fitted into said opening.

* * * * *